3,043,862
PROCESS FOR THE PRODUCTION OF ENOLACETATES

Theodor Altenschöpfer, Eduard Enk, Fritz Knörr, and Hellmuth Spes, all of Burghausen, Upper Bavaria, Germany, assignors to Wacker-Chemie G.m.b.H., Munich, Germany
No Drawing. Filed May 25, 1960, Ser. No. 31,535
Claims priority, application Germany June 2, 1959
5 Claims. (Cl. 260—488)

The present invention relates to an improved process for the production of enolacetates from enolizable carbonyl compounds and ketene.

It is known that ketene can be reacted with carbonyl compounds in the presence of catalysts to form beta-lactones or enolacetates. For example, when acetone is employed as the carbonyl compound either beta-methyl-beta-butyrolactone (I) or isopropenyl-acetate (II) can be produced.

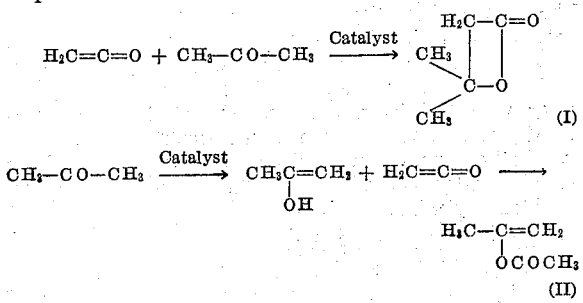

The lactone formation is, for example, catalysed by heavy metal (zinc, cobalt, iron II, lead, cadmium) salts of difluorophosphoric acid.

According to the invention it was unexpectedly found that enolacetates can be produced by reaction of ketene with an enolizable carbonyl compound at temperatures between 20 and 110° C., preferably, between 60 and 80° C., in the presence of an acid catalyst, namely, difluorophosphoric acid or equimolecular quantities of difluorophosphoric acid and monofluorophosphoric acid or the reaction product of the following equation:

$$P_2O_5 + 3HF \rightarrow HPO_2F_2 + H_2PO_3F$$

The process according to the invention can be carried out continuously or discontinuously. In continuous operation the catalyst concentrations can be kept lower than in discontinuous operation in view of the higher temperatures required in continuous operation and the resultant higher reaction velocities.

The formation of an enolacetate from an enolizable carbonyl compound is an equilibrium reaction. When very reactive carbonyl compounds, such as acetoacetic acid ethyl ester, are involved, a small quantity of catalyst and only a relatively small excess of carbonyl compound suffice for the enolization.

When relatively inactive carbonyl compounds, such as acetone, are involved, special measures must be taken to ensure that as many carbonyl molecules as possible are converted to the reactive enol form for reaction with the reactive ketene supplied. This can be accomplished by providing a large excess of carbonyl compound over the ketene supplied.

The molar ratio of ketene to carbonyl compound can be varied within wide ranges depending upon the constitution of the carbonyl compound employed. In the case of easily enolized carbonyl compounds, such as acetoacetic acid ethyl ester, the molar ratio of 1:1 is sufficient. On the other hand, in the case of carbonyl compounds which are difficult to enolize, such as acetone, a molar ratio of at least 1.4 mol carbonyl compound per mol of ketene must be provided in the case of continuous operation and at least 1.2 mol of carbonyl compound per mol of ketene must be provided in the case of discontinuous operation to ensure complete absorption of the ketene and to repress undesired side reactions.

The excess of carbonyl compound is maintained as low as possible for reasons of economy by increasing the percentual proportion of enolized carbonyl compound molecules by the use of relatively higher catalyst concentrations. However, relatively narrow limits are encountered in increasing the catalyst concentration as an over enolization can be caused in addition to the desired enolization whereby unsaturated hydrocarbons or their polymers are produced with the splitting off of water. The water which is split off reacts with 2 mols of ketene, with the production of undesired acetic acid anhydride. It was therefore found advantageous to maintain the catalyst concentration between 0.01 and 2% based upon the sum of the reactants.

The catalyst concentration furthermore is dependent upon the time the carbonyl compound-ketene mixture remains in the reaction vessel. A reduction in quantity of catalyst required can be effected by providing as long as possible a reaction path for the ketene molecules in the liquid carbonyl compound. However, limits are also encountered in this connection as when a certain critical time of stay is exceeded the reaction equilibrium is disturbed, and reformation of starting materials from the end product occurs. The critical time of stay at a given molar ratio of ketene to carbonyl compound depends upon the size of the charge and therefore necessarily also the quantity of catalyst present.

It is advantageous to neutralize the catalyst in order to recover the pure enolacetate quantitatively from the reaction mixture, for example, by distillation. In continuous operation of the process, the neutralization can also be continuous whereas in discontinuous operation such neutralization can be effected as soon as possible after formation of the reaction product.

In contrast to most previously employed catalysts, practically complete absorption of the ketene can be achieved using difluorophosphoric acid as a catalyst, not only in discontinuous operation but also in continuous operation, without taking special measures. Special apparatus, such as circulating evaporators or rapidly rotating stirrers, can be used to effect more thorough mixture of the ketene with the carbonyl compound, but they provide no substantial advantages as the enolacetate formation proceeds extraordinarily easily when employing difluorophosphoric acid as the catalysts. As a consequence, mechanical measures promoting the reactions can be completely avoided.

This can be of especial advantage in the technical application of the process, as no movable parts, such as stirrers or pumps, which can be attacked by the small quantities of rather aggressive acetic acid anhydride produced as a by-product, need be employed.

The catalyst can be supplied to the carbonyl compound by a metering pump directly before the reaction of such compound with the ketene, in view of the easy miscibility of the difluorophosphoric acid with carbonyl compounds. This is of especial advantage, as when recovered carbonyl compounds which still contain enolacetates are reemployed dark colorations can occur which render the metering difficult.

The following examples will serve to illustrate several embodiments of the invention:

Example 1

220 g. (5.24 mol) of ketene were supplied in 3.66 hours at a rate of 60 g. (1.43 mol) per hour to a boiling mixture of 406 g. (7.0 mol) of acetone and 10 g. (0.098 mol) difluorophosphoric acid in a glass frit flask provided with a reflux condenser and a thermometer. The molar ratio of ketene supplied to acetone was 1:1.34. The catalyst concentration was 4.54% with reference to the ketene supplied or 1.57% with reference to the sum of the reactants. 100% of the ketene supplied was absorbed.

The acetone which evaporated was condensed and returned to the reaction vessel over a siphon. The crude product was neutralized with sodium acetate and distilled. The following were obtained from the 636 g. of crude product 121.2 g. (2.10 mol) acetone
425.2 g. (4.25 mol) isopropenylacetate
4.02 g. (0.06 mol) acetic acid
44.8 g. (0.44 mol) acetic acid anhydride The acetic acid anhydride was purified by a second distillation so the ketene value (36.9 g.=0.88 mol) corresponding to the acetic anhydride could be taken into consideration as ketene recovered in the form of acetic anhydride in the calculation of the yields. Upon the basis of these figures, 60.6% of the acetone supplied was converted to isopropenyl acetate. The conversion of ketene into isopropenyl acetate was 81.2% based on the ketene supplied. The yield of isopropenyl acetate was 86.5% based on acetone consumed and 97.4% on ketene consumed.

*Example 2*

A mixture of 284.2 g. (2.84 mol) of isopropenyl acetate and 284.2 g. (4.9 mol) of acetone, as well as 5.7 g. (0.056 mol) difluorophosphoric acid was heated to boiling in a reaction vessel equipped with a reflux condenser and a thermometer. Then a mixture of 214.5 g. (3.69 mol) of acetone, 142.5 g. (3.40 mol) of ketene and 3.50 g. (0.034 mol) of difluorophosphoric acid (corresponding to 2.45% of the quantity of ketene) were supplied to the reaction vessel per hour. After the supply of ketene was begun, the supply of external heat was turned off as the heat released by the resulting exothermic reaction was sufficient to maintain the required reaction temperature of 73° C. The exhaust gas after it was cooled sharply to remove the acetone contained therein was passed through an absorption tower sprayed with acetic acid in order that the ketene still contained therein was converted by the acetic acid to acetic anhydride. The reaction product produced was continuously withdrawn from the reaction vessel over a cooler. The molar ratio of the ketene and acetone supplied was 1:1.09, corresponding to a molar ratio of absorbed ketene to acetone supplied of 1:1.11. This corresponds to a molar ratio of ketene supplied to total acetone of 1:1.45 or a molar ratio of absorbed ketene to total acetone of 1:1.47. The ketene absorption in the reactor was 561.3 g. (13.39 mol), corresponding to 98.3% of the ketene supplied. The period of time the reaction product remained in the reactor, which is defined as the quotient of $$\frac{\text{grams reactor content}}{\text{grams production-per hour}}$$

was 1.60 hours. After a four hour reaction period during which 570.8 g. (13.60 mol) of ketene, 858.0 g. (14.76 mol) of acetone and 13.98 (0.137 mol) of difluorophosphoric acid were supplied to the reactor, 2007.4 g. of reaction product were obtained which after neutralization with sodium acetate and distillation yielded:

410.2 g. (7.05 mol) acetone
1411.9 g. (14.09 mol) isopropenyl acetate (total)
11.27.7 g. (11.27 mol) isopropenyl acetate (newly formed during the reaction)
2.2 g. (0.037 mol) acetic acid (after deduction of acetic acid formed by neutralization of the catalyst acid)
99.9 g. (0.98 mol) acetic acid anhydride Therefore, the conversion of acetone supplied into isopropenyl acetate was 76.3%. The conversion of ketene supplied into isopropenyl acetate was 82.8%, or respectively the conversion of ketene absorbed into isopropenyl acetate was 84.3%. The yield of isopropenyl acetate was 89.4% based upon the acetone consumed and 99.1% based upon the ketene consumed.

*Example 3*

Analogously to Example 2, a starting mixture of 300.5 g. (3.0 mol) of isopropenyl acetate, 300.5 g. (5.17 mol) of acetone and 6 g. of an equimolecular mixture of monofluorophosphoric acid and difluorophosphric acid was placed in a reaction vessel of 700 cc. capacity and during a period of 5 hours a total of 817.4 g. (19.46 mol) of ketene, 2706 g. (46.60 mol) of acetone, and 34.5 g. of an equimolecular mixture of mono- and difluorophosphoric acids (corresponding to 4.22% of the quantity of ketene) were supplied thereto at an hourly rate of 163.5 g. (3.90 mol) of ketene, 541.2 g. (9.34 mol) of acetone and 6.9 g. of the equimolecular mixture of mono- and difluoro phosphoric acids. The molar ratio of ketene supplied to total acetone therefore was 1:2.66. The ketene absorption was 807.2 g. or 98.8% of the ketene supplied. Consequently, the molar ratio of ketene absorbed to total acetone was 1:2.74. The period of time the reaction product remained in the reactor was 0.86 hour. The catalyst concentration was 0.98% based upon the sum of the reactants. The 4140 g. of reaction product obtained after completion of the reaction after neutralization with sodium acetate and distillation yielded:

1969.3 g. (33.9 mol) acetone
1762.4 g. (17.62 mol) isopropenyl acetate (total)
1461.9 g. (14.61 mol) isopropenyl acetate (newly formed during the reaction)
25.4 g. (0.42 mol) acetic acid (from neutralization)
226.0 g. (2.22 mol) acetic acid anhydride Therefore the conversion of acetone supplied to isopropenyl acetate was 31.4% and the conversion of ketene supplied to isopropenyl acetate was 75.1%, whereas the conversion of ketene absorbed to isopropenyl acetate was 76.1%. The yield of isopropenyl acetate was 81.7% based on the acetone consumed and 99.0% based on the ketene consumed.

*Example 4*

Analogously to Example 2, a starting mixture of 42 kg. (420 mol) of isopropenyl acetate, 18 kg. (310 mol) of acetone, 3 kg. (29.4 mol) of acetic acid anhydride and 0.279 kg. (274 mol) of difluorophosphoric acid was placed in a reactor of 100 liters capacity and during a period of six hours, a total of 31.86 kg. (757.9 mol) of ketene, 72.7 kg. (1252 mol) of acetone and 0.23 kg. (2.26 mol) of difluorophosphoric acid (corresponding to 0.72% of the quantity of ketene) supplied thereto at an hourly rate of 5.31 kg. (126.3 mol) of ketene, 12.117 kg. (208.6 mol) of acetone and 0.038 kg. (0.376 mol) of difluorophosphoric acid.

The molar ratio of ketene supplied to total acetone was 1:2.06. The ketene absorption was quantitative. The period of time the reaction product remained in the reactor was 5 hours. The catalyst concentration was 0.31% based upon the sum of the reactants. The 167.069 kg. of reaction product obtained after completion of the reaction which amounted to 99.4% of the materials supplied after neutralization with 0.590 kg. (7.2 mol) of sodium acetate and distillation yielded:

50.469 kg. (870.1 mol) acetone
105.11 kg. (1050.0 mol) isopropenyl acetate (total)
63.11 kg. (631.1 mol) isopropenyl acetate (newly formed during reaction)
0.374 kg. (6.25 mol) acetic acid of which 76.2 g (1.27 mol) were formed during reaction 8.328 kg. (81.57 mol) acetic acid anhydride of which
  5.328 kg. (52.3 mol) were formed during reaction
0.732 kg. higher boiling components
1.296 kg. distillation residue corresponding to 0.78% of
  materials supplied.

Therefore the conversion of acetone supplied to isopropenyl acetate was 50.4%. The conversion of ketene supplied to isopropenyl acetate was 83.4%. The yield of isopropenyl acetate was 91.3% based on acetone consumed and 96.8% based on ketene consumed.

Example 5

Analogously to Examples 2 and 3, a starting mixture of 712 kg. (12.3 kg. mol) of acetone and 2.14 kg. (0.021 kg. mol) of difluorophosphoric acid was placed in a reactor of 1080 liters capacity and during a period of 164 hours a total of 10,496 kg. (250 kg. mol) of ketene, 23,028 kg. (397 kg. mol) of acetone and 71.77 kg. (0.704 kg. mol) of difluorophosphoric acid, corresponding to 0.68% of the quantity of ketene, supplied thereto at an hourly rate of 64 kg. (1.52 kg. mol) of ketene, 140.4 kg. (2.42 kg. mol) of acetone and 0.438 kg. (0.0043 kg. mol) of difluorophosphoric acid. The molar ratio of ketene supplied to total acetone was 1:1.63. The molar ratio of ketene absorbed to total acetone adjusted itself to 1:1.65, the acetone supply only being begun when a reaction temperature of 73° C. was reached. The ketene absorption was 10,422 kg. (248.3 kg. mol) or 99.3% of the ketene supplied. The period of time the reaction product remained in the reactor was 4.3 hours. The catalyst concentration was 0.22% based upon the sum of the reactants. The reaction product was continuously drawn off in the measure it was produced and was continuously neutralized with sodium acetate. The 34,136 kg. of reaction product obtained after completion of reaction which amounted to 99.5% of the materials supplied required a total of 83.5 kg. (1.02 kg. mol) of sodium acetate for its neutralization and after distillation yielded:

10,199 kg. (175.9 kg. mol) acetone
22,340 kg. (223.4 kg. mol) isopropenyl acetate
124.6 kg. (2.18 kg. mol) acetic acid (total)
81.5 kg. (1.36 kg. mol) acetic acid (formed during reaction)
978.4 kg. (9.59 kg. mol) acetic acid anhydride (total)
125 kg. (1.23 kg. mol) acetic acid anhydride (recovered from distillation residue)
334.6 kg. (0.98% of materials supplied) of dry distillation residue containing:
  114.2 kg. of a salt mixture of sodium difluorophosphate and sodium acetate
  242 kg. (0.71% of materials supplied) distillation loss.

Therefore, the conversion of acetone supplied to isopropenyl acetate was 56.4%. The conversion of ketene supplied to isopropenyl acetate was 89.5% or the conversion of ketene absorbed to isopropenyl acetate was 89.9%. The yield of isopropenyl acetate was 96.1% based upon the acetone consumed and 98.1% based upon the ketene consumed.

Example 6

A mixture of 600 g. (5.0 mol) of acetophenone and 3.5 g. of difluorophosphoric acid was placed in a glass fritted flask provided with a thermometer and reflux condenser and while maintaining a reaction temperature of 68–72° C. a total of 150.5 g. (3.58 mol) ketene was supplied thereto at a rate of 80 g. (1.90 mol) per hour. This corresponded to a molar ratio of ketene supplied to acetophenone of 1:1.4. The reaction mixture was vacuum distilled and 441.1 g. (2.72 mol) of alpha-acetoxy styrene of a boiling point of 85° C. at 2 mm. Hg and 250.0 g. (2.08 mol) acetophenone recovered therefrom. The conversion of ketene supplied into alpha-acetoxy styrene was 76.0%. The yield of alpha-acetoxy styrene based upon acetophenone consumed was 93.4%.

Example 7

A mixture of 614.0 g. (8.5 mol) of n-butyraldehyde and 1.2 g. of difluorophosphoric acid was placed in a glass fritted flask provided with a thermometer and reflux condenser and while maintaining a reaction temperature of 65–68° C. a total of 210 g. (5.0 mol) of ketene was supplied over a period of 3.5 hours at a rate of 60 g. (1.43 mol) per hour. This corresponded to a molar ratio of ketene supplied to n-butyraldehyde of 1:1.7. The catalyst concentration was 0.15% based on the sum of the reactants. Upon distillation of the reaction mixture 182.5 g. (1.6 mol) of n-butenyl acetate of a boiling point of 128° C. at 735 mm. Hg were obtained corresponding to a conversion of ketene supplied to n-butenyl acetate of 32%.

Example 8

Analogously to Example 2, a total of 630 g. (15.0 mol) of ketene, 2150 g. (16.5 mol) of acetoacetic acid ethyl ester were reacted over a period of 5 hours at 65–70° C. in a reactor of 700 cc. capacity using a total of 8.6 g. (0.085 mol) of difluorophosphoric acid as the catalyst. The period of time the reaction product remained in the reactor was 1.26 hours. The catalyst concentration was 0.31% based upon the sum of the reactants. The ketene absorption was quantitative. Upon neutralization of the reaction mixture and vacuum distillation, 2250 g. of enolacetates of acetoacetic acid ethyl ester of a boiling point of 94° C. at 10 mm. Hg were obtained, corresponding to a conversion of the ketene supplied into enolacetates of 87% and a yield of 95% based upon acetoacetic acid ethyl ester consumed.

Example 9

A mixture of 500.6 g. (5.0 mol) of acetyl acetone and 0.6 g. of difluorophosphoric acid was placed in a glass fritted flask provided with a thermometer and reflux condenser and while maintaining a reaction temperature of 65–70° C. a total of 210 g. (5 mol) of ketene was supplied over a period of 3.5 hours at a rate of 60 g. (1.43 mol) per hour. This corresponded to a molar ratio of ketene supplied to acetyl acetone of 1:1. The catalyst concentration was 0.08% based upon the sum of the reactants. Upon vacuum distillation of the reaction mixture 497.0 g. (3.5 mol) of the monoenolacetate of acetyl acetone of a boiling point of 82–84° C. at 10 mm. Hg were obtained, corresponding to a 70% conversion of the ketene into the monoenolacetate.

Example 10

A mixture of 500.6 g. (5.0 mol) of acetyl acetone and 1.5 g. of difluorophosphoric acid were placed in a glass fritted flask provided with a thermometer and reflux condenser and while maintaining a reaction temperature of 65–70° C. a total of 420.4 g. (10 mol) of ketene was supplied over a period of 7 hours at a rate of 60 g. (1.43 mol) per hour. This corresponded to a molar ratio of ketene supplied to acetyl acetone of 2:1. The catalyst concentration was 0.16% based upon the sum of the reactants. Upon vacuum distillation of the reaction mixture, 320.0 g. (2.25 mol) of monoenolacetate of a boiling point of 82–84° C. at 10 mm. Hg and 156.0 g. (0.85 mol) of di-enolacetate of a boiling point of 114° C. at 10 mm. Hg were obtained. This corresponded to a 45% conversion of the acetyl acetone into the monoenolacetate and a 17% conversion of the acetyl acetone into the di-enolacetate.

Enolacetates can be employed for various purposes. Isopropenyl acetate for example, is used for the acetylization of alcohols, amines and carboxylic acids. Furthermore it is known to produce acetyl acetone by the pyrolysis of isopropenyl acetate. Besides it was found that copolymers of vinyl alcohol with alkylated phenyl alcohols may be employed advantageously as dispersing agents at the suspension and emulsion polymerization of polymerizable compounds. Thereby, above all such copolymers are suitable, which contain 5–40%, preferably 5–20% alkylated vinyl alcohol.

We claim:

1. In a process for the production of enolacetates by conversion of enolizable carbonyl compounds selected from the group consisting of butyraldehyde, acetone, acetophenone, acetoacetic acid ethyl ester and acetyl acetone with ketene in the presence of an acid catalyst, the step which comprises carrying out such conversion in the presence of a catalyst selected from the group consisting of difluorophosphoric acid and equimolar mixtures of difluorophosphoric acid and monofluorophosphoric acid.

2. The process of claim 1 in which such conversion is carried out at a temperature between 20 and 110° C.

3. The process of claim 1 in which said conversion is carried out at a temperature between 60 and 80° C.

4. The process of claim 1 in which the quantity of catalyst is 0.01–2% by weight based upon the sum of the reactants.

5. A process for the production of isopropenyl acetate which comprises reacting ketene with acetone in contact with difluorophosphoric acid.

References Cited in the file of this patent

UNITED STATES PATENTS 2,466,655     Degering _____ Apr. 5, 1949

OTHER REFERENCES

Rose: "The Condensed Chemical Dictionary," fifth edition, Reinhold Publishing Corp., New York (1956), page 493.